(12) United States Patent
Cypher

(10) Patent No.: US 8,949,852 B2
(45) Date of Patent: Feb. 3, 2015

(54) MECHANISM FOR INCREASING PARALLELIZATION IN COMPUTER PROGRAMS WITH READ-AFTER-WRITE DEPENDENCIES ASSOCIATED WITH PREFIX OPERATIONS

(75) Inventor: Robert E. Cypher, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 931 days.

(21) Appl. No.: 12/493,538

(22) Filed: Jun. 29, 2009

(65) Prior Publication Data

US 2010/0333108 A1    Dec. 30, 2010

(51) Int. Cl.
*G06F 9/46* (2006.01)
*G06F 9/45* (2006.01)

(52) U.S. Cl.
CPC ...................................... *G06F 8/452* (2013.01)
USPC ............................ 718/106; 718/100; 717/149

(58) Field of Classification Search
None
See application file for complete search history.

(56) References Cited

U.S. PATENT DOCUMENTS

| | | | |
|---|---|---|---|
| 5,937,194 A * | 8/1999 | Sundaresan | 717/119 |
| 5,966,528 A * | 10/1999 | Wilkinson et al. | 712/222 |
| 6,292,822 B1 * | 9/2001 | Hardwick | 718/105 |
| 7,877,573 B1 * | 1/2011 | Le Grand | 712/7 |
| 7,991,817 B2 * | 8/2011 | DeHon et al. | 708/505 |
| 8,037,462 B2 * | 10/2011 | Archambault et al. | 717/149 |
| 2003/0126589 A1 * | 7/2003 | Poulsen et al. | 717/149 |
| 2008/0127145 A1 * | 5/2008 | So et al. | 717/149 |
| 2008/0127146 A1 * | 5/2008 | Liao et al. | 717/150 |
| 2008/0263329 A1 * | 10/2008 | Archer et al. | 712/213 |
| 2010/0076941 A1 * | 3/2010 | Dotsenko et al. | 707/705 |
| 2010/0241828 A1 * | 9/2010 | Yu et al. | 712/30 |
| 2010/0306750 A1 * | 12/2010 | Helovuo | 717/143 |

\* cited by examiner

*Primary Examiner* — Meng An
*Assistant Examiner* — Tammy Lee
(74) *Attorney, Agent, or Firm* — Park, Vaughan, Fleming & Dowler LLP; Chia-Hsin Suen

(57) ABSTRACT

Some embodiments provide a system that increases parallelization in a computer program. During operation, the system obtains a binary associative operator and a ordered set of elements associated with a prefix operation in the computer program. Next, the system divides the elements into multiple sets of contiguous iterations based on a number of processors used to execute the computer program. The system then performs, in parallel on the processors, a set of local reductions on the contiguous iterations using the binary associative operator. Afterwards, the system calculates a set of boundary prefixes between the contiguous iterations using the local reductions. Finally, the system applies, in parallel on the processors, the boundary prefixes to the contiguous iterations using the binary associative operator to obtain a set of prefixes for the prefix operation.

21 Claims, 3 Drawing Sheets

MECHANISM FOR INCREASING PARALLELIZATION IN COMPUTER PROGRAMS WITH READ-AFTER-WRITE DEPENDENCIES ASSOCIATED WITH PREFIX OPERATIONS

BACKGROUND

1. Field

The present embodiments relate to techniques for parallelizing computer code. More specifically, the present embodiments relate to a method and system for parallelizing loops with read-after-write (RAW) dependencies.

2. Related Art

Computer system designers are presently developing mechanisms to support multi-threading within the latest generation of Chip-Multiprocessors (CMPs) as well as more traditional Symmetric Multiprocessors (SMPs). With proper hardware support, multi-threading can dramatically increase computational performance. In particular, faster execution times may be achieved by concurrently executing portions of computer programs on multiple processors of a computer system. Furthermore, concurrent execution of sequential computer programs may be enabled using automatic parallelization techniques that convert the sequential computer programs into multi-threaded code.

Automatic parallelization of sequential computer programs may be accomplished in a number of ways. First, a parallelizing compiler may convert high-level sequential code for a computer program into multi-threaded binary code. For example, the parallelizing compiler may split up a loop in the computer program so that the loop's iterations may be concurrently executed on separate processors. Parallelization may also be provided by a virtual machine that parses high-level bytecode and spawns multiple threads to execute portions of the bytecode in parallel. For example, a Java (Java™ is a registered trademark of Sun Microsystems, Inc.) Virtual Machine may concurrently execute portions of a Java program on multiple processors in a computer system. Finally, parallelizing mechanisms may exist in software that analyzes compiled (e.g., binary or machine) code and identifies portions of the code that may be executed in parallel.

However, portions of computer programs with certain types of read-after-write (RAW) dependencies may not be parallelizable using current parallelization techniques. In general, a loop that calculates a reduction of each prefix of an ordered set and uses each reduction in other calculations may not be parallelized due to RAW hazards associated with the reduction variable. For example, a loop that calculates a running sum and uses the intermediate partial sums in other calculations may not be parallelized due to the RAW hazard associated with the running sum variable. Consequently, loops containing such reduction operations may not fully utilize the parallel execution capabilities of CMPs or SMPs.

Hence, what is needed is a mechanism for increasing parallelization in computer programs with RAW dependencies.

SUMMARY

The present embodiments provide a system that increases parallelization in a computer program. During operation, the system obtains a binary associative operator and an ordered set of elements associated with a prefix operation in the computer program. Next, the system divides the elements into multiple sets of contiguous iterations based on a number of processors used to execute the computer program. The system then performs, in parallel on the processors, a set of local reductions on the contiguous iterations using the binary associative operator. Afterwards, the system calculates a set of boundary prefixes between the contiguous iterations using the local reductions. Finally, the system applies, in parallel on the processors, the boundary prefixes to the contiguous iterations using the binary associative operator to obtain a set of prefixes for the prefix operation.

In some embodiments, the prefix operation is performed within a loop in the computer program.

In some embodiments, dividing the elements into multiple sets of contiguous iterations involves at least one of:
  (i) dividing the elements substantially equally between the processors; and
  (ii) dividing the elements between the processors using a load-balancing technique.

In some embodiments, the boundary prefixes are calculated in parallel or sequentially.

In some embodiments, each of the elements corresponds to a tuple.

In some embodiments, the parallelization is provided by a compiler or a virtual machine.

In some embodiments, the binary associative operator corresponds to addition, multiplication, maximum, minimum, a binary logical operator, a carry generate, a carry propagate, matrix multiplication, and finite state machine evaluation.

BRIEF DESCRIPTION OF THE FIGURES

In the figures, like reference numerals refer to the same figure elements.

DETAILED DESCRIPTION

Figure 1:
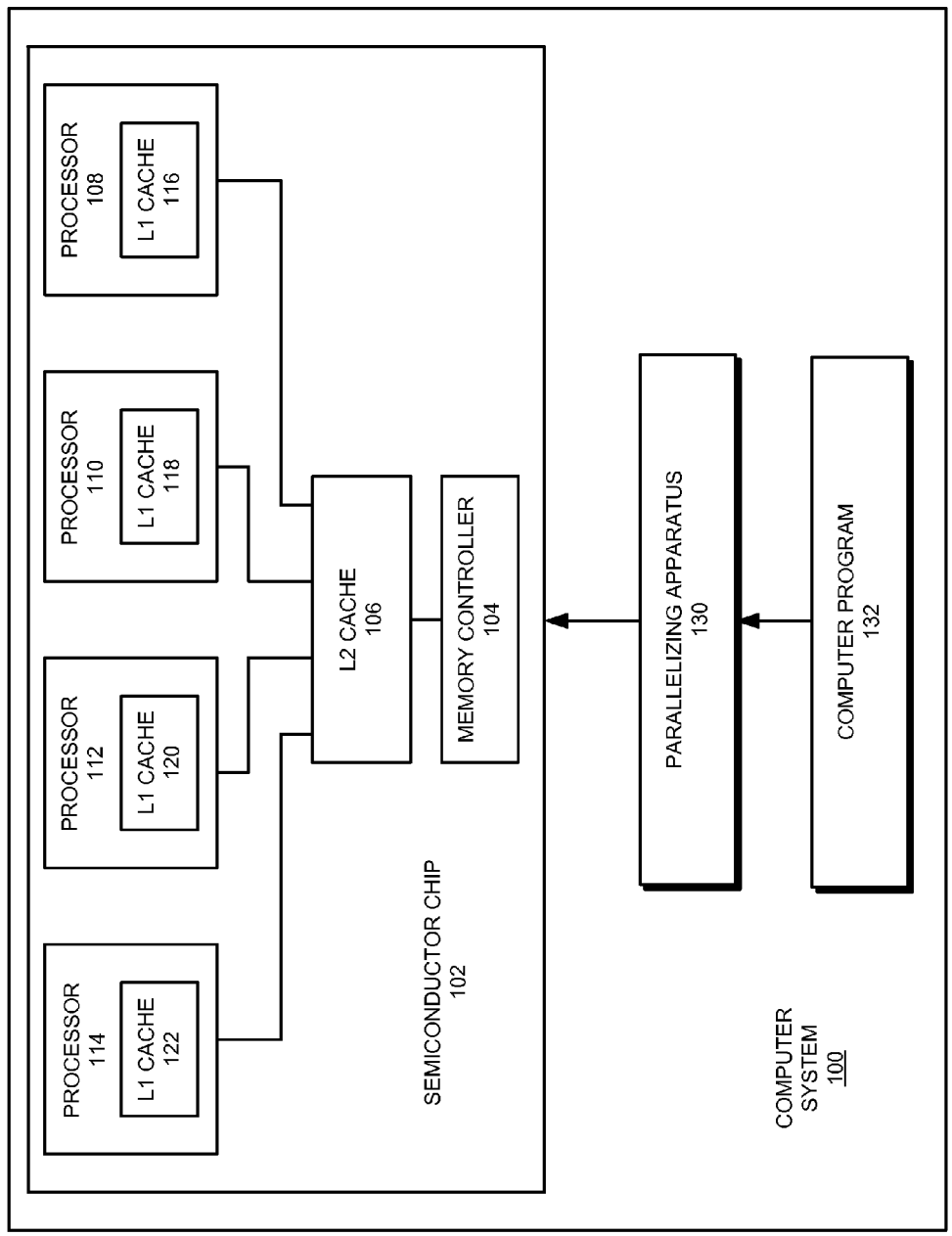
FIG. 1 shows a computer system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for increasing parallelization in a computer program. The computer program may correspond to an application, library, database, operating system, and/or device driver. The computer program may be executed on a computer system that is capable of parallel execution, such as a Chip-Multiprocessor (CMP) or Symmetric Multiprocessor (SMP) computer system.

More specifically, embodiments provide a method and system for automatically parallelizing loops in the computer program that contain prefix operations. To parallelize a loop containing a prefix operation, the prefix operation may be divided into a set of contiguous loop iterations for execution on multiple processors in the computer system. Next, a set of local reductions is performed on the contiguous iterations in parallel on the processors. The local reductions may be used to calculate a set of boundary prefixes between the contiguous iterations, which may then be applied to the contiguous iterations in parallel on the processors to obtain the prefixes for the prefix operation. Because all but a small portion of the prefix operation is concurrently executed, the computer program may be parallelized to a greater extent than with other automatic parallelization techniques, which in turn may boost computational performance for both the computer program and the computer system.

FIG. 1 shows a computer system 100 in accordance with an embodiment. Computer system 100 can generally include any type of computer system, including, but not limited to, a computer system based on a microprocessor, a mainframe computer, a digital signal processor, a portable computing device, a personal organizer, a device controller, and/or a computational engine within an appliance.

As shown in FIG. 1, computer system 100 includes a number of processors 108-114 on a single semiconductor chip 102 (e.g., a Chip-Multiprocessor (CMP)). On the other hand, processors 108-114 may be physically separated from one another (e.g., in a Symmetric Multiprocessor (SMP)). Processors 108-114 may be used to concurrently execute computer programs (e.g., computer program 132) on computer system 100, including applications, libraries, databases, operating systems, and/or device drivers. Processors 108-114 each contain a level one (L1) cache 116-122. L1 caches 116-122 may be separate instruction and data caches, or alternatively, unified instruction/data caches.

L1 caches 116-122 are coupled to a level two (L2) cache 106. L2 cache 106 is additionally coupled to off-chip memory (not shown) through memory controller 104. In one or more embodiments, L1 caches 116-122 are write-through caches. Hence, all updates to L1 caches 116-122 are automatically propagated to L2 cache 106. Such automatic propagation may simplify the coherence protocol (e.g., directory-based coherence, bus snooping, etc.) between L1 caches 116-122. For example, if processor 108 requires a data item that is present in L1 cache 116, processor 108 may receive the data from L2 cache 106 without having to wait for L1 cache 116 to source the data.

In one or more embodiments, computer system 100 includes functionality to automatically parallelize computer programs executing on processors 108-114. More specifically, a parallelizing apparatus 130 within computer system 100 may enable automatic parallelization of a sequential computer program 132. For example, parallelizing apparatus 130 may correspond to a parallelizing compiler that converts high-level sequential code into multi-threaded binary or machine code. Along the same lines, parallelizing apparatus 130 may correspond to a virtual machine (e.g., a Java (Java™ is a registered trademark of Sun Microsystems, Inc.) Virtual Machine) that parses high-level bytecode (e.g., Java bytecode) and spawns multiple threads on processors 108-114 for concurrent execution of the bytecode. Parallelizing apparatus 130 may also include a mechanism for analyzing compiled (e.g., binary or machine) code and identifying portions of the compiled code that may be executed in parallel on processors 108-114. In other words, parallelizing apparatus 130 may be configured to parallelize code from computer program 132 in a variety of formats (e.g., high-level code, bytecode, assembly language, machine code, etc.) in either hardware (e.g., on semiconductor chip 102 or a separate integrated circuit) or software (e.g., executing on one or more processors 108-114).

In particular, parallelizing apparatus 130 may include functionality to parallelize loops in computer program 132 with certain read-after-write (RAW) dependencies. In one or more embodiments, the RAW dependencies are associated with prefix operations within the loops. Each prefix operation may include a binary associative operator such as addition, multiplication, maximum, minimum, a binary logical operator (e.g., OR, XOR, AND), a carry generate, a carry propagate, matrix multiplication, or finite state machine evaluation. Furthermore, the prefix operation may apply the binary associative operator to an ordered set of elements to obtain a set of prefixes for the elements.

For example, if the prefix operation specifies an array of five integer elements (e.g., A[0] through A[4]) and a binary associative operator for addition (e.g., +), the prefixes for the integer elements may be calculated as five running sums between the first integer element and every other integer element (e.g., A[0], A[0]+A[1], A[0]+A[1]+A[2], A[0]+A[1]+A[2]+A[3], A[0]+A[1]+A[2]+A[3]+A[4]). Exemplary pseudocode containing the prefix operation with a running sum may include the following:

sum=0;
for (i=0; i<5; i++) {B[i]=B[i]+C[i]; sum=sum+A[i]; D[i]=D[i]*sum; }

Within the exemplary pseudocode, the prefix operation may operate on elements of the array A, elements of the array D depend on the prefix operation, and elements of the arrays B and C are independent of the prefix operation.

Those skilled in the art will appreciate that techniques for performing prefix operations within loops typically avoid parallelizing the loops due to RAW hazards associated with calculating reductions of the prefixes. Instead, such loops may be executed sequentially, even if parallelization mechanisms (e.g., parallelizing apparatus 130, processors 108-114) are available for improving the computational performance of computer programs (e.g., computer program 132) containing the loops.

On the other hand, parallel solutions for calculating reductions of prefixes on n ordered elements may be performed in a limited sense in approximately 2*log n time using a binary tree or in approximately log n time using a butterfly network. Such solutions are not typically used in the parallelization of loops with RAW dependencies. Moreover, such solutions may not fully parallelize the prefix operation between multiple processors. As a result, the existence of prefix operations and/or other operations with similar RAW dependencies in computer program 132 may prevent significant portions of computer program 132 from being automatically parallelized.

However, parallelizing apparatus 130 may include functionality to increase parallelization of prefix operations in computer program 132. As discussed below with respect to FIG. 2, such increased parallelization may execute all but a small portion of each prefix operation in parallel on processors 108-114, thus increasing the computational performance of both the prefix operations and of computer program 132.

Figure 2:
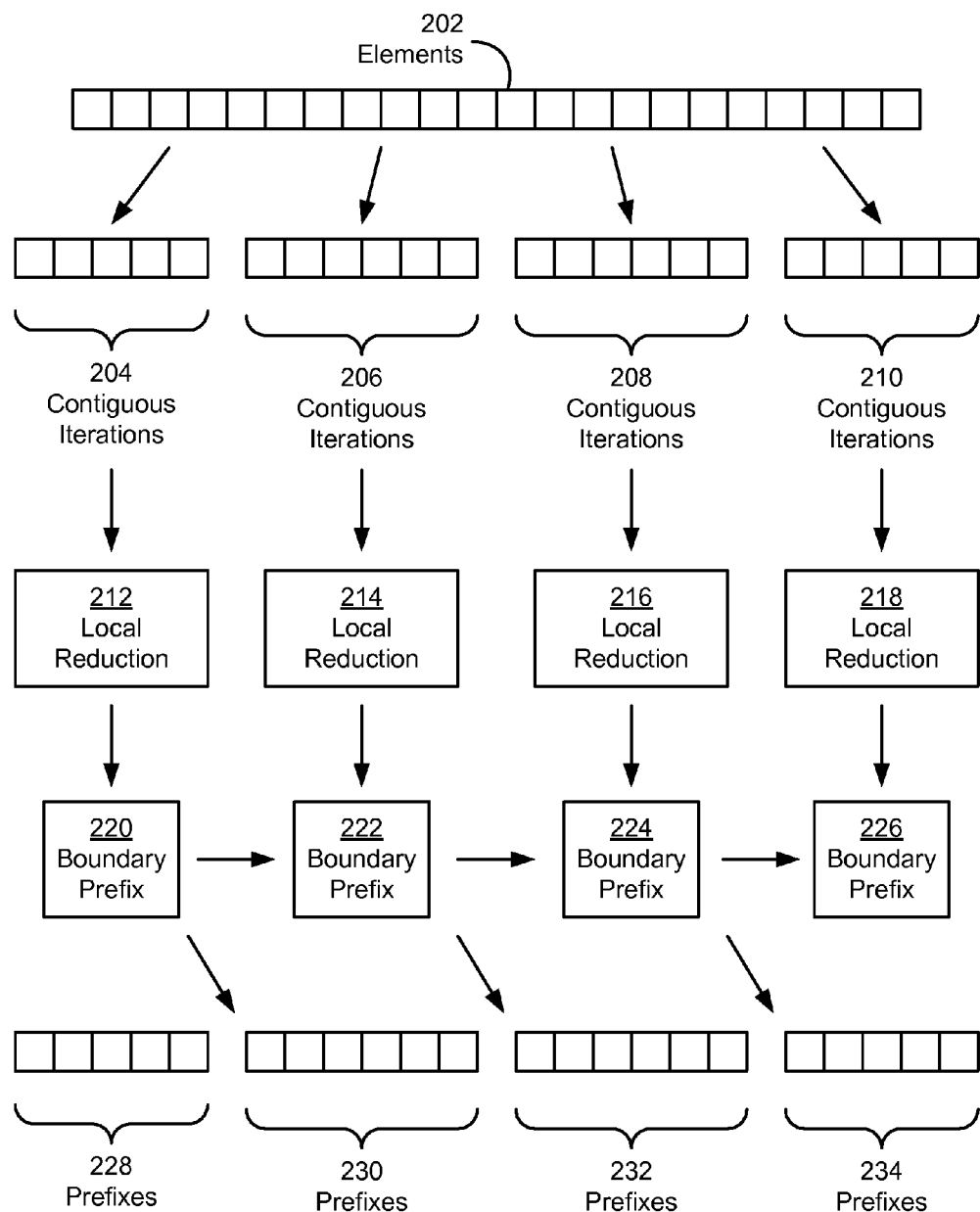
FIG. 2 shows the automatic parallelization of a prefix operation in accordance with an embodiment.

FIG. 2 shows the automatic parallelization of a prefix operation in accordance with an embodiment. The automatic parallelization may be performed by a parallelizing apparatus, such as parallelizing apparatus 130 of FIG. 1. As shown in FIG. 2, the prefix operation is associated with an ordered set of elements 202 stored in an array, linked list, and/or other data structure. The prefix operation may additionally include a binary associative operator to be applied to elements 202, such as addition, multiplication, maximum, minimum, a binary logical operator (e.g., OR, XOR, AND), a carry generate, a carry propagate, matrix multiplication, or finite state machine evaluation. More specifically, the prefix operation may be performed within a loop that repeatedly applies the binary associative operator to elements 202 to obtain a set of prefixes 228-234 for elements 202.

The binary associative operator may be applied to elements 202 of data types such as strings, integers, and/or floating-point numbers. On the other hand, the binary associative operator may be applied to elements 202 containing composite data types such as tuples. For example, each of the elements 202 may include a tuple that contains a value of the element and a location of the element. A binary associative operator that calculates the maximum of elements 202 may compare element values but update the maximum with both the value and the location of the element with the highest value.

To perform the prefix operation, the parallelizing apparatus may divide elements 202 into multiple sets of contiguous iterations 204-210 (e.g., contiguous loop iterations). In particular, 22 elements 202 may be divided into two contiguous iterations 204 and 210 of five elements each, and two contiguous iterations 206-208 of six elements each. The parallelizing apparatus may create contiguous iterations 204-210 based on the number of processors used to execute the prefix operation. In other words, four sets of contiguous iterations 204-210 may be created for parallel execution on four processors. Moreover, elements 202 may be divided into contiguous iterations 204-210 based on a load-balancing technique between the processors and/or substantially equally (e.g., sets of five or six elements).

After contiguous iterations 204-210 are formed, a set of local reductions 212-218 is calculated from contiguous iterations 204-210. In one or more embodiments, local reductions 212-218 are calculated in parallel on the processors. Local reduction 212 is calculated from contiguous iterations 204 by one processor, local reduction 214 is calculated from contiguous iterations 206 by a second processor, local reduction 216 is calculated from contiguous iterations 208 by a third processor, and local reduction 218 is calculated from contiguous iterations 210 by a fourth processor.

In one or more embodiments, each local reduction 212-218 corresponds to an application of the binary associative operator between all elements in the corresponding set of contiguous iterations 204-210. For example, if the binary associative operator corresponds to multiplication and elements 202 are indexed in an array as A[0] through A[21], local reduction 212 may represent the product of A[0] through A[4], local reduction 214 may represent the product of A[5] through A[10], local reduction 216 may represent the product of A[11] through A[16], and local reduction 218 may represent the product of A[17] through A[21].

Next, a set of boundary prefixes 220-226 is calculated from local reductions 212-218. Boundary prefixes 220-226 may correspond to values of prefixes between contiguous iterations 204-210. In other words, boundary prefix 220 may represent the prefix for the fifth element, boundary prefix 222 may represent the prefix for the $11^{th}$ element, boundary prefix 224 may represent the prefix for the $17^{th}$ element, and boundary prefix 226 may represent the prefix for the $22^{nd}$ element. Continuing with the example of multiplication, boundary prefixes 220-226 may represent the products of the first through the fifth, $11^{th}$, $17^{th}$, and $22^{nd}$ elements, respectively.

In addition, boundary prefixes 220-226 may be calculated in parallel or sequentially. As shown in FIG. 2, boundary prefix 220 may be copied from local reduction 212, boundary prefix 222 may be calculated sequentially from local reduction 214 and boundary prefix 220, boundary prefix 224 may be calculated sequentially from local reduction 216 and boundary prefix 222, and boundary prefix 226 may be calculated sequentially from local reduction 218 and boundary prefix 224. Alternatively, boundary prefixes 220-226 may be calculated using a butterfly network, binary tree, and/or other conventional parallel technique for performing a prefix operation.

Finally, sets of prefixes 228-234 are calculated by applying boundary prefixes 220-226 to contiguous iterations 204-210 using the binary associative operator in parallel on the processors. In particular, prefixes 228 may be obtained from the calculation of local reduction 212, prefixes 230 may be obtained by applying boundary prefix 220 to contiguous iterations 206, prefixes 232 may be obtained by applying boundary prefix 222 to contiguous iterations 208, and prefixes 234 may be obtained by applying boundary prefix 224 to contiguous iterations 210. Because boundary prefix 226 serves as the final prefix for elements 202, boundary prefix 226 does not have to be calculated prior to calculating prefixes 234. On the other hand, boundary prefix 226 may be calculated with boundary prefixes 220-224 if such calculation increases the speed with which the prefix operation is performed.

Consequently, the vast majority of the prefix operation of FIG. 2 is performed in parallel on four processors. Only the calculation of a relatively small number of boundary prefixes 220-226 (compared with the number of elements) may require sequential execution and/or may not fully utilize all available processors. Such increased parallelization provides an improvement over existing parallelization techniques by allowing for faster execution of the prefix operation as well as of the computer program containing the prefix operation.

Those skilled in the art will appreciate that the automatic parallelization of the prefix operation shown in FIG. 2 may be adopted for any number of elements and any number of processors. For example, automatic parallelization may be provided for a prefix operation that includes a large number (e.g., hundreds or thousands) of elements and a relatively small number (e.g., four, eight, etc.) of processors using the mechanism described in FIG. 2. Conversely, as the number of processors increases relative to the number of elements, the calculation of local reductions and prefixes is increasingly parallelized while the calculation of boundary prefixes may be parallelized to occur in logarithmic time. In other words, the automatic parallelization provided by FIG. 2 may increase parallelization of prefix operations regardless of the number of processors and elements involved.

Those skilled in the art will also appreciate that the increased parallelization provided in FIG. 2 may be adapted for use with prefix operations within different types of loops and/or nested loops. For example, nested prefix operations may be parallelized by parallelizing the innermost loop containing a prefix operation and proceeding outward. Loops with boundary conditions (e.g., for loops with exit conditions, while loops, etc.) that contain prefix operations may also be parallelized using the technique of FIG. 2 by parallelizing the calculations associated with each prefix operation until a boundary condition associated with a certain prefix is discovered (e.g., a local reduction satisfies an exit condition). Calculations for elements after the prefix may be discarded because such calculations are unnecessary, while calculations for elements prior to the prefix may be reallocated among the processors for faster execution of the remainder of the prefix operation.

Figure 3:
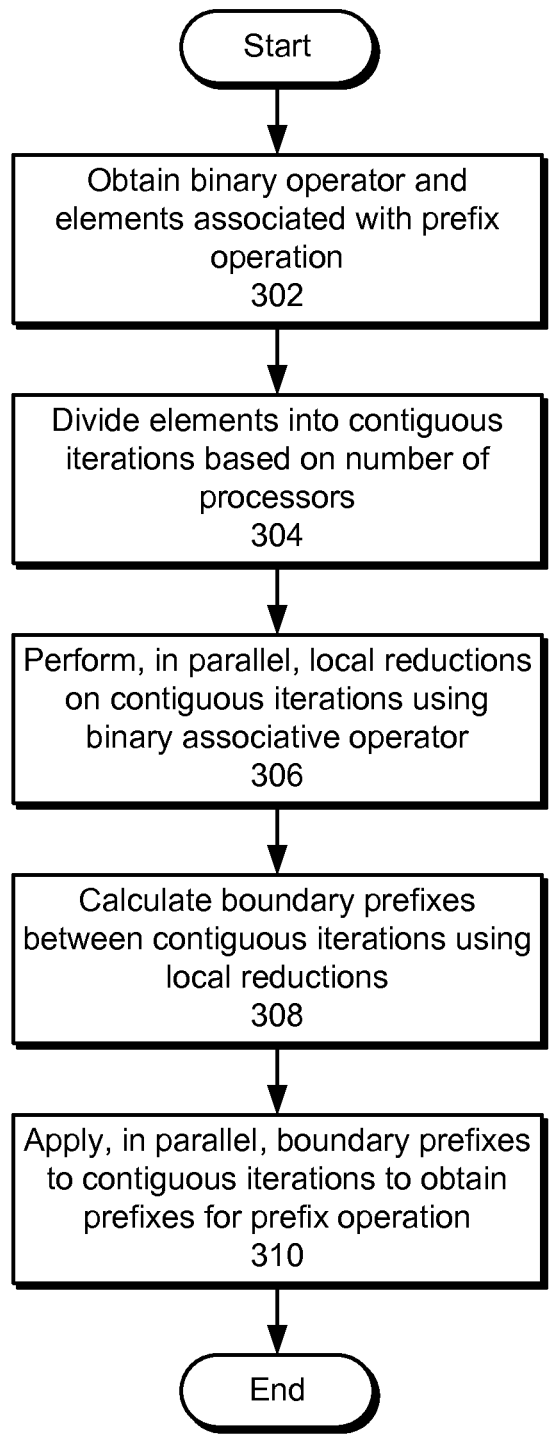
FIG. 3 shows a flowchart illustrating the process of increasing parallelization in a computer program in accordance with an embodiment.

FIG. 3 shows a flowchart illustrating the process of increasing parallelization in a computer program in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

Initially, a binary associative operator and an ordered set of elements associated with a prefix operation in the computer program are obtained (operation 302). The prefix operation may be contained within a loop (e.g., for loop, while loop, etc.) in the computer program. The binary associative operator may correspond to addition, multiplication, maximum, minimum, a binary logical operator (e.g., OR, XOR, AND), a carry generate, a carry propagate, matrix multiplication, or finite state machine evaluation. The elements may be stored in an array, linked list, or other data structure and may correspond to simple data types or tuples.

Next, the elements are divided into multiple sets of contiguous iterations based on a number of processors used to execute the computer program (operation 304). The elements may be divided substantially equally among the processors and/or using a load-balancing technique between the processors. For example, 105 elements may be divided among four processors into contiguous iterations of 26 or 27 elements, or among the same four processors based on other workloads to be executed on each processor.

After the contiguous iterations are formed, a set of local reductions is performed in parallel on the contiguous iterations using the binary associative operator (operation 306). In other words, each local reduction may be concurrently obtained by a separate processor that applies the binary associative operator to the corresponding set of contiguous iterations. For example, four local reductions may be concurrently obtained for a prefix operation that includes a logical OR operator by four processors that apply the logical OR operator to four sets of contiguous iterations that correspond to the elements in the prefix operation.

Boundary prefixes are then calculated between the contiguous iterations using the local reductions (operation 308). As discussed above, the boundary prefixes may be calculated sequentially from one another and from the corresponding local reductions, or the boundary prefixes may be calculated in parallel using a binary tree, butterfly network, or other parallel prefix technique.

Finally, the boundary prefixes are applied in parallel to the contiguous iterations to obtain a set of prefixes for the prefix operation (operation 310). In particular, the boundary prefix corresponding to the last element of one set of contiguous iterations is applied to the next set of contiguous iterations to obtain the prefixes for the next set of contiguous iterations. Moreover, prefixes for the contiguous iterations may be obtained in parallel by the processors because the calculation of the prefixes for each set of contiguous iterations depends only on the boundary prefix, computed in operation 308, preceding the set of contiguous iterations.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for increasing parallelization in a computer program, comprising:
   obtaining a binary associative operator and an ordered set of elements associated with a prefix operation in the computer program;
   dividing the elements into multiple sets of contiguous iterations based on a number of processors used to execute the computer program;
   calculating, in parallel on the processors, a set of local reductions from the contiguous iterations, wherein each local reduction in the set is calculated by applying the binary associative operator between all elements in a corresponding contiguous iteration from the set of the contiguous iterations;
   for each given local reduction in a subset of the local reductions, calculating a first boundary prefix for the given local reduction by using the given local reduction and a second boundary prefix for a second local reduction in a second subset that precedes the given local reduction, wherein the second boundary prefix is calculated from the second local reduction and a third boundary prefix for a third local reduction in a third subset that precedes the second subset; and
   obtaining a set of prefixes for the ordered set of elements by applying, in parallel on the processors, the boundary prefixes to the contiguous iterations using the binary associative operator.

2. The computer-implemented method of claim 1, wherein the prefix operation is performed within a loop in the computer program.

3. The computer-implemented method of claim 1, wherein dividing the elements into multiple sets of contiguous iterations involves at least one of:
   dividing the elements substantially equally between the processors; and
   dividing the elements between the processors using a load-balancing technique.

4. The computer-implemented method of claim 1, wherein the boundary prefixes are calculated in parallel or sequentially.

5. The computer-implemented method of claim 1, wherein each of the elements corresponds to a tuple.

6. The computer-implemented method of claim 1, wherein the parallelization is provided by at least one of a compiler and a virtual machine.

7. The computer-implemented method of claim 1, wherein the binary associative operator corresponds to addition, multiplication, maximum, minimum, a binary logical operator, a carry generate, a carry propagate, matrix multiplication, and finite state machine evaluation.

8. The computer-implemented method of claim 1, wherein the contiguous iterations are arranged in a sequence so that, for each contiguous iteration, an order of the contiguous iteration in the sequence is based on an order, in the ordered set of elements, of the elements that the contiguous iteration includes, wherein the local reductions are arranged in a sequence based on the sequence for the contiguous iterations so that, for each of the local reductions, an order for the local reduction in the sequence of the local reductions corresponds to an order of the contiguous iteration from which the local reduction is calculated, wherein the subset of the local reductions excludes a first local reduction in the sequence of the local reductions, and wherein using the local reduction in the subset that precedes the given local reduction comprises using a local reduction in the subset that immediately precedes the given local reduction in the sequence of the local reductions.

9. The computer-implemented method of claim 1, wherein using the given local reduction and the boundary prefix for the local reduction that precedes the given local reduction comprises applying the binary associative operator between the given local reduction and the boundary prefix for the local reduction that precedes the given local reduction, and wherein the boundary prefix for the given local reduction corresponds to a prefix in the set of prefixes that is between the contiguous iteration for the given local reduction and the contiguous iteration for the local reduction that precedes the given local reduction.

10. The computer-implemented method of claim 1, wherein the set of contiguous iterations comprise a first, a second, and a third contiguous iteration, wherein the set of local reductions comprises a first, a second, and a third local reduction, wherein the first local reduction is calculated by applying the binary associative operator between all of the elements that are in the first contiguous iteration, wherein the second local reduction is calculated by applying the binary associative operator between all of the elements that are in the second contiguous iteration, and wherein the third local reduction is calculated by applying the binary associative operator between all of the elements that are in the third contiguous iteration, wherein calculating the boundary prefixes comprises calculating a first and a second boundary prefix, wherein the first boundary prefix is copied from the first local reduction, and wherein the second boundary prefix is calculated by applying the binary associative operator between the first boundary prefix and the second local reduction, wherein the set of prefixes comprises a first, a second, and a third subset of prefixes, wherein the first subset of prefixes is obtained from the local reduction, wherein the second subset of prefixes is obtained by applying the first boundary prefix to the second local reduction, and wherein the third subset of prefixes is obtained by applying the second boundary prefix to the third local reduction.

11. A system for increasing parallelization in a computer program, comprising:

a set of processors configured to execute the computer program; and a parallelization apparatus configured to:

obtain a binary associative operator and an ordered set of elements associated with a prefix operation in the computer program;

divide the elements into multiple sets of contiguous iterations associated with the processors;

calculate, in parallel on the processors, a set of local reductions from the contiguous operations, wherein the parallelization apparatus is configured to calculate each local reduction in the set by applying the binary associative operator between all elements in a corresponding contiguous iteration from the set of the contiguous iterations;

for each given local reduction in a subset of the local reductions, calculate a first boundary prefix for the given local reduction by using the given local reduction and a second boundary prefix for a second local reduction in a second subset that precedes the given local reduction, wherein the second boundary prefix is calculated from the second local reduction and a third boundary prefix for a third local reduction in a third subset that precedes the second subset; and obtain a set of prefixes for the ordered set of elements by applying, in parallel on the processors, the boundary prefixes to the contiguous iterations using the binary associative operator.

12. The system of claim 11, wherein the prefix operation is performed within a loop in the computer program.

13. The system of claim 11, wherein dividing the elements into multiple sets of contiguous iterations involves at least one of:

dividing the elements substantially equally between the processors; and dividing the elements between the processors using a load-balancing technique.

14. The system of claim 11, wherein the boundary prefixes are calculated in parallel or sequentially.

15. The system of claim 11, wherein each of the elements corresponds to a tuple.

16. A non-transitory computer-readable storage medium storing instructions that when executed by a computer cause the computer to perform a method for increasing parallelization in a computer program, the method comprising:

obtaining a binary associative operator and an ordered set of elements associated with a prefix operation in the computer program;

dividing the elements into multiple sets of contiguous iterations based on a number of processors used to execute the computer program;

calculating, in parallel on the processors, a set of local reductions from the contiguous iterations, wherein each local reduction in the set is calculated by applying the binary associative operator between all elements in a corresponding contiguous iteration from the set of the contiguous iterations;

for each given local reduction in a subset of the local reductions, calculating a first boundary prefix for the given local reduction by using the given local reduction and a second boundary prefix for a second local reduction in a second subset that precedes the given local reduction, wherein the second boundary prefix is calculated from the second local reduction and a third boundary prefix for a third local reduction in a third subset that precedes the second subset; and obtaining a set of prefixes for the ordered set of elements by applying, in parallel on the processors, the boundary prefixes to the contiguous iterations using the binary associative operator.

17. The computer-readable storage medium of claim 16, wherein the prefix operation is performed within a loop in the computer program.

18. The computer-readable storage medium of claim 16, wherein dividing the elements into multiple sets of contiguous iterations involves at least one of:

dividing the elements substantially equally between the processors; and dividing the elements between the processors using a load-balancing technique.

19. The computer-readable storage medium of claim 16, wherein the boundary prefixes are calculated in parallel or sequentially.

20. The computer-readable storage medium of claim 16, wherein the parallelization is provided by at least one of a compiler and a virtual machine.

21. The computer-readable storage medium of claim 16, wherein the binary associative operator corresponds to addition, multiplication, maximum, minimum, a binary logical operator, a carry generate, a carry propagate, matrix multiplication, and finite state machine evaluation.

* * * * *